United States Patent [19]
Dockser

[11] Patent Number: 5,613,151
[45] Date of Patent: Mar. 18, 1997

[54] DATA PROCESSOR WITH FLEXIBLE REGISTER MAPPING SCHEME

[76] Inventor: Kenneth A. Dockser, 3132 Terra Cotta Ct., San Jose, Calif. 95135

[21] Appl. No.: 567,408

[22] Filed: Dec. 5, 1995

Related U.S. Application Data

[63] Continuation of Ser. No. 245,981, May 19, 1994, abandoned.

[51] Int. Cl.$^6$ .............................. G06F 12/06; G06F 12/10
[52] U.S. Cl. ..................... 395/800; 395/412; 395/416
[58] Field of Search ..................... 395/375, 733, 395/650, 402, 184.01, 700, 495, 855, 800, 727, 126, 403, 478, 479, 416, 477, 411, 412, 467; 364/DIG. 1, DIG. 2, 449

[56] References Cited

U.S. PATENT DOCUMENTS

| | | | |
|---|---|---|---|
| 4,382,278 | 5/1983 | Appelt | 395/425 |
| 4,503,491 | 3/1985 | Lushtak et al. | 395/400 |
| 4,511,964 | 4/1985 | Georg et al. | 395/400 |
| 4,747,070 | 5/1988 | Trottier et al. | 364/DIG. 2 |
| 4,829,425 | 5/1989 | Bain et al. | 364/DIG. 1 |
| 4,853,849 | 8/1989 | Camargo et al. | 395/408 |
| 4,926,314 | 5/1990 | Dhuey | 395/425 |
| 4,937,738 | 6/1990 | Uchiyama et al. | 395/425 |
| 5,065,310 | 11/1991 | Stone | 395/425 |
| 5,182,801 | 1/1993 | Asfour | 395/425 |

OTHER PUBLICATIONS

Furber, Stephen B., *VLSI RISC Architecture and Organization*, Marcel Dekker, Inc., New York, New York, 1989, pp. 82–83, 111–112, 193–195.

Patterson, David A., and Hennessy, John L., *Computer Architecture a Quantitative Approach*. Morgan Kaufmann Publishers, Inc., San Mateo, California, pp. 246, 450–454, E9–E11.

VLSI Technology, Inc., *Megacell Library I*, Rev. 2.0, pp. 1–22.

VLSI Technology, Inc., *VY86C610 32–Bit Enhanced Microprocessor*, pp. 5, 6, 38–40.

*Primary Examiner*—Daniel H. Pan
*Attorney, Agent, or Firm*—Anderson Patents

[57] ABSTRACT

A data processor includes 32 user registers arranged in two banks of 16 registers each. 4-bit addressing is provided. A 16-bit map register determines the bank from which an addressed register is selected. This determination is made individually for each address. The map register is readable and writable so that the mapping of addresses to banks is under program control. This arrangement provides for accessing a large number of registers using a short address code; registers remaining addressable after a remapping retain their addresses.

4 Claims, 2 Drawing Sheets

DATA PROCESSOR WITH FLEXIBLE REGISTER MAPPING SCHEME

This is continuing application of U.S. patent application Ser. No. 08/245,981, filed May 19, 1994, now abandoned.

BACKGROUND OF THE INVENTION

The present invention relates to data processors and, more particularly, to register mapping schemes for data processors. A major objective of the present invention is to enhance data processor performance through improved register management.

Much of modern technological progress is associated with the increasing functionality and speed of modern data processors. Data processors perform calculations on numerical data in accordance with program instructions. The instructions, the data on which the instructions are to operate, and the intermediate and final results of the operations are stored in registers within the data processor.

Registers are the fastest memory available to a data processor. Calculation throughput is enhanced every time required data is fetched from a register rather than from slower memories. Instructions and series of instructions which use several data values iteratively can tax the capacity of a data processor's registers. Once register capacity is exceeded, execution is delayed while some values are transferred out of the registers to cache or main memory. Execution is further delayed when those values must be returned to the registers.

To minimize external memory operations, large numbers of registers can be used. Prior constraints on the numbers of registers, most notably the scarcity of integrated circuit area, have been ameliorated by advances in semiconductor processing technologies that permit more functionality per unit area. In addition, the trend toward reduced instruction set computing (RISC) has relaxed competition for integrated circuit area by reducing the area required for decoding and executing instructions. Several RISC architectures are described in the textbook *VLSI RISC Architecture and Organization* by Stephen B. Furber, Marcel Dekker, Inc., New York, N.Y., 1989.

While constraints on the number of registers have been ameliorated, there remain constraints on the number of registers that can be addressed at a time. Larger numbers of registers to be addressed require more instruction bits to be reserved for addressing. This reduces the space in an instruction available for other purposes. Although it is possible to increase instruction size to hold additional address bits, this change adversely affects program length and execution time. The effect of a longer address on a program is amplified by the large number of instructions that require register addresses.

Several schemes for managing registers have been developed so that a large number of registers can be accessed using a short address code. The simplest of these management schemes is bank switching. Registers are arranged in two or more mutually exclusive banks. Only one bank is available for addressing at a time. Infrequent bank switching instructions switch the bank to be accessed by addressing. The values in the prior bank are preserved and can be retrieved by switching back to the prior bank. Thus, ready access can be provided to more registers than can be addressed at one time.

Bank switching faces a problem when some of the values in the first bank need to be accessed at the same time as some values in the second bank. In these situations, data must be copied or moved to the second bank. Such data transfers require careful data tracking by the programmer and consume considerable execution time. In some specialized cases, sections of a bank can be switched independently. However, the situations in which this reduces the need for data transfers between banks are very limited.

Windowing is an alternative to banking. The main difference between a window and a bank is that successive windows can overlap, while banks typically do not. In a windowing scheme, the registers are serialized and the window is located using a window pointer. If 4-bit addressing is used, 16 registers can be addressed. If the window pointer is incremented by one, the second window can share 15 registers with the first window. If the window is incremented by 8, 8 registers are shared. If the window is incremented by 15, 1 register is shared. If the window is incremented by 16 or more, no registers are shared.

The overlap flexibility provided by windowing greatly reduces the need to transfer data between groups of registers. However, when a window is moved, the ordinal position of each register remaining in the window changes. Accordingly, the register addresses change, and such changes can require tracking. Furthermore, to accommodate instructions that expect certain data to be at certain addresses, some intrawindow swapping can be required. Once again, this swapping impairs execution throughput.

Another scheme that enables a large number of registers to be mapped using a small address is register renaming. Register renaming provides for a group of registers, each of which can be given any register address (name). This technique requires an additional set of map registers to associate an address with each register, greatly increasing the amount of hardware needed. Since the registers are not dedicated to a particular address, the tracking required can become quite difficult. The amount of time required for a program to manage the mapping easily negates the speed advantages of having the additional registers. Thus, the map registers are typically only accessible to the machine, and this scheme is typically only used for recovery from exceptions.

Thus, available register management schemes frequently require movement of data between registers and complicated tracking, degrading data processor performance. What is needed is a data processor that incorporates a register management scheme that is flexible enough to permit register data to be combined in various ways while inter-register transfers and tracking requirements are minimized.

SUMMARY OF THE INVENTION

In accordance with the present invention, a data processor provides a register management scheme that independently maps each register address to a respective register bank. The data processor includes an execution unit, registers, suitable internal communication paths, and input/output ports for communicating with an incorporating system. The register management scheme can be implemented using one or more map registers that indicate the bank to which each address is currently assigned. The map registers are preferably user registers that can be read from and written to by a computer program.

In a simple implementation of the present invention, user data registers are organized into two banks of 16 registers each. The map register is 16 bits, corresponding to the 16 ordinal register positions in each bank, and thus to 16 possible addresses. Each map register bit, in effect, determines the bank to which each respective address is mapped. Thus, a "0" at the first bit routes the first address to the first bank; a "1" at the second bit routes the second address to the second bank. In effect, this scheme provides for $2^{16}$ virtual register banks.

To illustrate the use of this scheme, assume that all map bits are set to "0" so that the selected virtual bank is the first physical bank. At some point during program execution, additional register space is required, but all the data stored in the first bank is required for immediate or near term instruction execution. More specifically, assume that the data in the seventh register of the first bank is required "soon" but not immediately. The seventh bit of the map register can be set to "1", and the seventh register of the second register bank is available for addressing. All other registers of the first bank have their original data, and all that data is available at the original addresses. Furthermore, the data at the 7th register of the first bank can be made available at any time by resetting the 7th bit of the map register to "0".

The present invention applies more generally to registers arranged in any number of physical banks with any number of registers per bank. The map register(s) are then sized to provide the necessary bank selection for each address.

The present invention provides for the mapping means either to be accessible (e.g., a user register) or inaccessible (invisible to the user). In the former case, the programmer can control the selection of virtual banks. Furthermore, the current virtual bank can be determined by reading the map register. This reduces tracking burdens for the programmer and allows for verification of tracking that is done.

The flexibility provided for by the present invention can be measured in virtual register banks, i.e., the number of ways the available registers can be addressed. A conventional (unswitched) addressing scheme provides one way to address registers. A bank-switching scheme provides two ways to address 32 registers 16 at a time. A windowing scheme provides 17 ways of addressing 32 registers 16 at a time. The present invention provides $2^{16}$ (more than 65,000) ways of addressing 32 registers 16 at a time. Of course, there are many more ways of selecting 16 of 32 registers, such as register renaming, but the present invention selects those that preserve the addresses of the stored data with minimal additional complexity.

An advantage over the renaming scheme is that mapping is fast and straightforward so the additional registers provide a performance advantage. An advantage over the bank-switching scheme, but shared with the windowing and renaming schemes, is that the number of registers preserved in a switch can be selected. Another advantage over the bank-switching scheme is that data does not have to be transferred between banks for it to be used after a switch. An advantage over the windowing scheme is that data does not have to be swapped within a virtual bank to retain its old address. These advantages are provided while tracking of virtual registers is simplified by providing a readable map register. Thus, external memory and inter-register transfers are minimized by the present invention. This minimization increases processing speeds and reduces power consumption. These and other features and advantages of the present invention are apparent from the description below with reference to the following drawings.

DESCRIPTION OF THE PREFERRED
EMBODIMENTS

Figure 1:
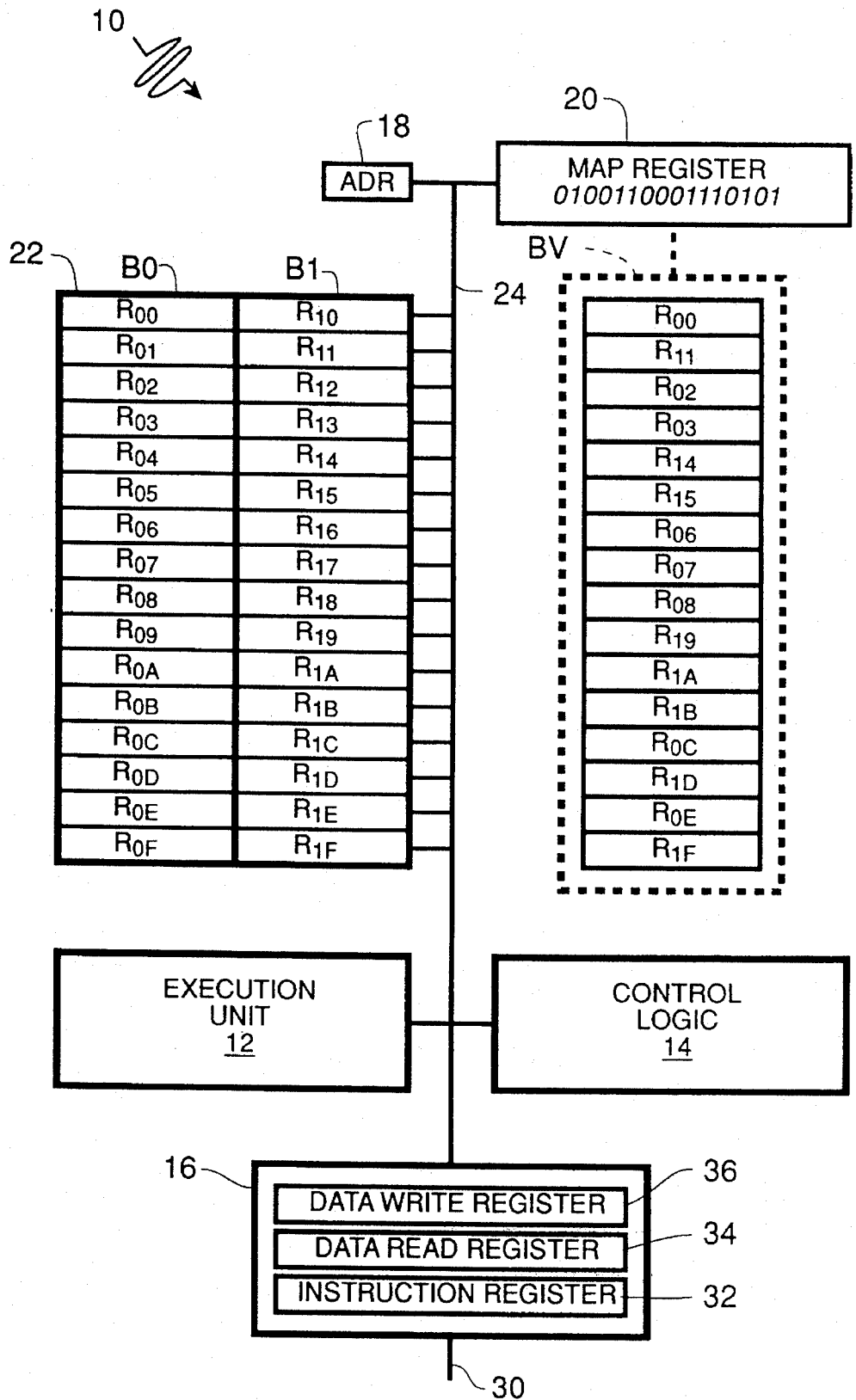
FIG. 1 is a schematic view of a data processor in accordance with the present invention having two banks of user registers.

In accordance with the present invention, a data processor 10 comprises an execution unit 12, control logic 14, an input/output port 16, an address register 18, a map register 20, a register array 22, and a bus 24, shown in FIG. 1. Control lines emitting from control logic 14 are omitted for simplicity. Data processor 10 communicates with an incorporating computer system via input/output bus 30.

Port 16 includes an instruction register 32, a data read register 34, and a data write register 36. Array 22 includes two physical register banks B0 and B1. Bank B0 includes 16 registers R00, R01, . . . , R0F, identified herein with hexadecimal subscripts; Bank B1 includes 16 registers R10, R12, . . . , R1F.

Map register 20 functions to define a virtual register bank BV consisting of physical registers drawn from array 22. Map register 20 is 16 bits wide, each bit corresponding to a ordinal position within a register bank. For a given bit, a value of "0" indicates that the physical register at the corresponding position in virtual bank BV is drawn from the same ordinal position of bank B0. For a given bit, a value of "1" indicates that the physical register at the corresponding position in virtual bank BV is drawn from the same ordinal position of bank B1. In FIG. 1, the virtual bank BV is shown consisting of the physical registers selected by map register 20 when its contents are 0100110001110101, also as indicated in FIG. 1. Since map register 20 has 16 bits, there are $2^{16}$ possible virtual registers.

In operation, data and instructions are received by data processor at port 16 along input/output bus 30. Instructions are stored in instruction register 32, while incoming data is stored in data read register 34. Instructions stored in instruction register 32 are input to control logic for implementation.

The instruction set for data processor 10 includes an instruction to load the value in data read register 34, e.g., 0100110001110101, into map register 20. Another instruction causes the value stored in map register 20 to be loaded into data write register 32, where the value is made available to the incorporating computer system.

When the contents of map register 20 are 0000000000000000, virtual register BV includes the physical registers of bank B0. When the contents of map register 20 are changed to 0100110001110101, as indicated in FIG. 1, registers R11, R14, R15, R19, R1A, R1B, R1D, and R1F of bank B1 replace their bank B0 counterparts in virtual register BV, while registers R00, R02, R03, R06, R07, R08, R0C, and R0E remain in virtual register BV. The four-bit addresses required to access these remaining registers are unchanged. To access data previously stored in registers that were replaced, map register 20 is rewritten to make these registers addressable.

More conventional instructions are also provided, such as an instruction to read from or write to an addressed user register. As virtual register BV indicates, control logic 14 selects the register at the ordinal position indicated by the 4-bit value stored in address register 18 from the bank indicated by the value stored at the respective bit position of map register 20. Thus, if "0000" is stored in address register 18 and map register is filled as shown in FIG. 1., register R00 is selected. If "0001" is the address, register R11 is selected. If "0010" is the address, R02 is selected.

Figure 2:
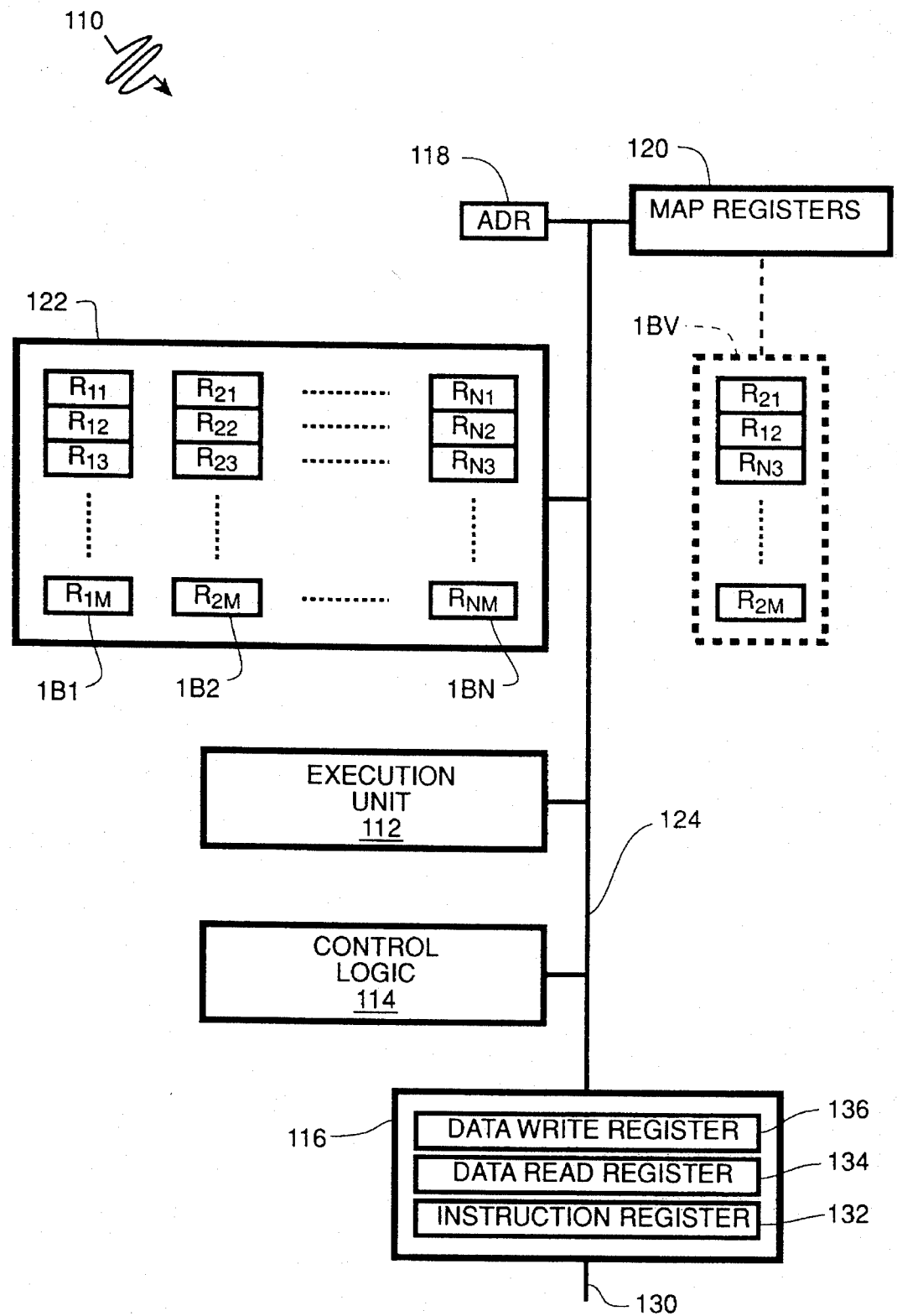
FIG. 2 is a schematic view of another data processor in accordance with the present invention having N banks of user registers.

While data processor 10 provides for 4-bit addressing of 32 registers, the present invention provides for much larger numbers of registers. Accordingly, data processor 110 comprises an execution unit 112, control logic 114, an input/output port 116, an address register 118, a set of map registers 120, and a user register array 122, as shown in FIG. 2. Port 116 includes an instruction register 132, a data read register 134, and a data write register 136.

Array 122 includes N*M registers arranged in N banks B1, B2, ..., BN of M registers each. The number of bits of address register 118 is the smallest integer greater than or equal to $\log_2(M)$ bits. The total number of bits in map register set 120 is M*P, where P is the smallest integer greater than or equal to $\log_2(N)$. As demonstrated by data processor 110, the present invention can be scaled to provide a wide numerical range of user registers with a selectable number of address bits.

The present invention provides for embodiments beyond the range indicated by data processors 10 and 110 described above. Execution units can provide a range of functions and combinations of functions including integer shift and logic operations, floating point operations, etc. Input/output can be along a single or multiple buses. Likewise, internal data flow can be along single or multiple buses. An input/output port can use a single register for instructions, plural registers either for pipelining or for specific functions. The control logic can be varied according to function and can include one or more instruction registers to facilitate their execution. The address register can be separate or combined with another register, including the map register or registers.

The present invention provides for utilization of registers other than those qualifying as part of the array. For example, in supervisory mode, some supervisor mode registers can be switched with user registers. These and other modifications to and variations upon the preferred embodiments are provided for by the present invention, the scope of which is limited only by the following claims.

What is claimed is:

1. In a data processor, a register scheme comprising:

N*M physical registers arranged in N banks with M ordinal positions within each bank, where M and N are integers greater than or equal to 2, each of said registers being located at a respective one of said ordinal positions within a respective one of said banks;

register address means for indicating one of M register addresses, each of said addresses corresponding to a respective one of said M ordinal positions;

map storage means for storing a map assigning each of said M ordinal positions to a respective one of said banks, said map storage means including means for receiving said map; and control logic for addressing the one of said N*M registers having its ordinal position corresponding to said one register address indicated by said register address means and its bank indicated by said map as corresponding to said ordinal position, said control logic being cupled to said N*M registers them, said control logic being coupled to said register means for determining which of said M ordinal positions is to be addressed, said control logic being coupled to said map storage means for determining which of said N banks is to be addressed.

2. A data processor as recited in claim 1 wherein said map is selected from a set of $N^M$ distinct maps of addresses to registers.

3. A data processor as recited in claim 2 wherein said map is rewrittable so that said map can be replaced by another of said $N^M$ distinct maps.

4. A data processor as recited in claim 1 wherein:

said map storage means includes readout for reading out said map in response to a map read instruction.

* * * * *

UNITED STATES PATENT AND TRADEMARK OFFICE
CERTIFICATE OF CORRECTION

PATENT NO. : 5,613,151
DATED : March 18, 1997
INVENTOR(S) : Kenneth A. Dockser

It is certified that error appears in the above-identified patent and that said Letters Patent is hereby corrected as shown below:

Column 1, line 4, before "continuing", insert --a--.
Column 4, line 35, insert a space between "$2^{16}$" and "possible".
Column 6, line 22, change "cupled" to --coupled--.
Column 6, line 22, after "registers" insert --for addressing--.
Column 6, line 23, after "register" insert -- address--.

Signed and Sealed this

Third Day of February, 1998

BRUCE LEHMAN

*Attest:*

*Attesting Officer*   *Commissioner of Patents and Trademarks*